106. COMPOSITIONS, COATING OR PLASTIC.
86
Cross Reference
EXAMINER
P. CLAES.
PROCESS OF AGGLOMERATING MATERIALS.
APPLICATION FILED DEC. 27, 1909.
1,034,203.
Patented July 30, 1912.
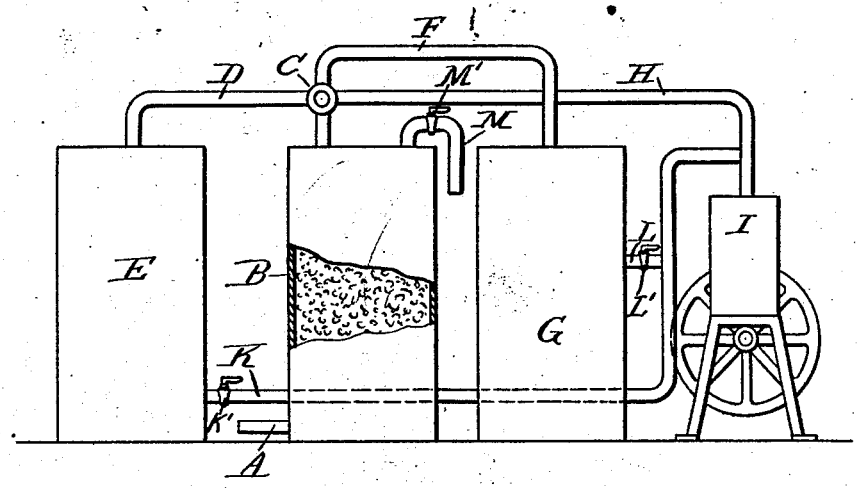
Witnesses
HC Hunsberger
M. Hefling
Inventor
Paul Claes,
By B. Singer,
Attorney

UNITED STATES PATENT OFFICE.

PAUL CLAES, OF BRUSSELS, BELGIUM.

PROCESS OF AGGLOMERATING MATERIALS.

1,034,203. Specification of Letters Patent. Patented July 30, 1912.

Application filed December 27, 1909. Serial No. 535,142.

*To all whom it may concern:*

Be it known that I, PAUL CLAES, a subject of the King of Belgium, residing at 96 Rue des Melezes, Brussels, Belgium, have invented certain new and useful Improvements in Processes of Agglomerating Materials, of which the following is a specification.

The present invention relates to an improved process for the agglomeration of the residues or refuse from operations involving metallic and mineral substances, in the form of small particles or dust, or other artificial or natural substances which cannot be otherwise advantageously utilized.

Processes for the production of artificial stone have hitherto been known, in which a mixture consisting of lime and other suitable materials is molded into blocks for the purpose of forming the artificial stone, and the molded blocks are then placed in vessels, and the air contained in the vessels is more or less rarefied. After the latter operation, the blocks are then subjected to the action of carbon dioxid in order to convert the lime contained in the mixture into carbonate. By employing a vacuum, which is produced in the old processes by means of a pump, the result is obtained that the air contained in the vessels is slowly removed so that carbon dioxid may be admitted to the interior of the vessels, and a certain amount of air which is imprisoned within the blocks escapes from the blocks during the formation of the vacuum.

The processes known at this time for the carbonation of artificial stone and the like as above outlined, are all very slow, about twenty-four hours being required for carbonating a layer of material of one inch depth, and consequently these processes can only be practically performed for producing expensive products, such as artificial stone for ornamental purposes or marble imitations.

The chief objection against the known processes, which is the main cause of the impracticability of quickly and thoroughly carbonating the material, and an objection which the herein described process is designed to overcome, and in which lies its novelty, consists in the fact that when the mass of artificial stone or other material to be agglomerated or hardened is still in pasty condition, the small air bubbles contained in the mass, diffuse slowly on account of the great length of time which is consumed in effecting a vacuum or rarefying the air to the degree desired. The air thus very slowly diffuses along the path of least resistance in the stone, and the lack of force in the movement of the air prevents it from forming large pores in the material. If any pores or channels at all are formed, they are so minute that they are generally closed up by capillary action of the material, and therefore no means are furnished for the quick carbonation of the material to a depth below that of the most superficial layers.

In contradistinction to all of the old processes making use of the vacuum, and destined, according to the ideas of their inventors to form compact blocks of stone or artificial marble, the present process is designed for the manufacture of small porous agglomerates on a large scale, for melting purposes or to be used as fuel, the distinguishing feature of this process being that a vacuum is employed in an entirely novel manner for obtaining a novel result, that is, an extremely rapid and thorough carbonation of the materials throughout their whole mass, and to facilitate the fusion and combustion of the material.

The present process may be performed by using waste metals, ores to be reduced, and combustible materials which are to be made into briquets. The porosity which is imparted to the agglomerated substances is an important feature of the invention, because it facilitates the penetration of the reducing gases when the materials are to be fused, and it admits of the more ready combustibility of briquets formed according to the invention. Another advantage of the invention is, that the agglomeration of the materials is so perfect, that the materials cannot be reduced to fragments during transportation or as a result of rough handling.

According to the present invention, the material to be agglomerated is reduced to small pieces and powder and dust and is thoroughly mixed with the necessary quantities of lime and water. The paste is then molded under a pressure which varies according to the nature of the substance treated. The small moist briquets are then placed in a vessel in which a vacuum can be almost instantly produced. The high degree of porosity of the material is obtained by this almost instantaneous formation of a vacuum, the air contained in the still pasty briquets expanding under such conditions with so great a force as to cause the formation of numerous passages for the escape of the air in the interior of the mass to without the same. Openings are thereby produced which are not closed again, and which afford passages for the penetration of the carbon dioxid with which the material is treated, into every part of the interior of the mass. The carbonation of the material is therefore most rapidly effected thoughout all parts of the briquets or other material, and can be effected completely in the space of a few minutes. As further helping toward this perfect and exceedingly rapid carbonation, the stream of carbon dioxid is introduced under high pressure into the vessel containing the briquets, after they have become porous by the sudden exhaustion of the air contained in the vessel. The reaction of the carbon dioxid gas and the lime is so violent that the water present in the briquets or other material to be agglomerated is almost instantly vaporized, the heat of the reaction causing this and also causing the more perfect formation of the carbonate.

An apparatus for effecting the process constituting the present invention is shown diagrammatically in the attached sheet of drawing.

In the said drawing B represents a vessel of any suitable shape, but preferably cylindrical, into which briquets or other material to be agglomerated and containing lime and water as the agglomerating means are introduced. In order to secure the best results from the process, the material should be fed into the vessel B so that it occupies about 95% of the volume of the vessel, air occupying the remaining 5% of space within the vessel. Disposed adjacent vessel B are two vessels E and G of substantially equal volume to that of vessel B, and the vessel B may be connected with the vessels E and G by means of the pipe D, pipe F, and the four-way valve C which is placed at the junction of the pipes F, D and H, the latter connecting vessel B with pump I. Pump I is connected with vessel E by means of pipe K, and it is connected with vessel G by means of pipe L. The vessel B being cut off from communication with either of the vessels E and G as a result of the four-way valve C being in its proper position, a more or less perfect vacuum may be produced within the vessels E and G by opening cocks K' and L', and setting the air pump I in operation. This may be done either before or after the molded and pressed briquets or other material to be agglomerated are introduced into the vessel B. A vacuum having been produced in these vessels, the four-way cock C is then turned so that the interior of vessel B communicates with the interior of vessel E. The air within vessel B is then instantly exceedingly rarefied, and in accordance with the conditions hereinbefore laid down, will be rarefied to about one-twentieth of an atmosphere. The four-way cock C is then immediately turned so that connection between vessel B and vessel G is established, with the result that the already rarefied air within vessel B will be rarefied to the exceedingly high degree of one four-hundredth of an atmosphere. These operations take place with such rapidity, that the air contained within the briquets has a violent tendency to find its way to the exterior of the briquets, with the result that it produces rather large pores or passages through all parts of the material. The carbon dioxid gas is immediately allowed to enter the vessel B, after the operations above described, by means of the pipe A, the gas being preferably supplied from a vessel containing it under high pressure. The reaction between the carbon dioxid gas and the lime contained in the material to be agglomerated is so violent that the moisture contained in the material is expelled as a result of the heat generated during the reaction, the expelled moisture being allowed to pass from the vessel B by means of the pipe M having a valve M'. The great amount of heat generated as a result of the exceedingly quick and violent reaction tends to a more perfect formation of carbonate of lime in the material, and as before stated, the conditions under which the material is treated render the same highly porous so that the carbon dioxid gas reaches, in a very short space of time, the most inner parts of the material to be treated, thus securing a perfectly effective carbonation of the material.

I claim:

1. Process of agglomerating materials, which consists in mixing the material to be agglomerated with lime, molding the material into the desired shape, suddenly producing a vacuum about the molded material so that the sudden and violent movement of the air bubbles contained in the interior of the molded material causes passages to be established throughout the mass, and then passing a stream of carbon dioxid under pressure into contact with the material.

2. Process of agglomerating materials, which consists in mixing the material to be agglomerated with lime and water and forming the same into a suitable paste, molding the material into the desired shape and subjecting the same to pressure, suddenly producing a vacuum about the molded maabove way is to be employed as building or as insulating material, it is mixed as already explained, with suitable binding material, such as cement, gypsum, asphalt or the like for building material, or with silicate, pitch or the like for insulating material.

In making the mixture, the materials must be thoroughly incorporated and then finally brought into the desired form under pressure, the pressure being maintained until the materials harden or set.

Preferably four to ten parts of the crushed porous slag are mixed with about one part of the binding material. If the body thus obtained is not water-proof, as for example, is the case when cement is employed as a binding material, it can be made water-proof by coating or saturating it with a water-proofing material such as asphalt, pitch, tar and the like. The body so obtained is remarkable for its exceedingly great porosity and, therefore, its low specific gravity, which is less than that of water, and is generally much less than one-fourth of such specific gravity. It contains or incloses a certain quantity of dead air, whose presence essentially adds to the insulating properties of the material. Insulating bodies of this kind which are made with the help of cement or silicates are especially resistant against the influences of the atmosphere, water and fire.

A compound prepared according to this invention has combined great strength with lightness, the weight of the same per cubic yard being only a small fraction of that of the concrete compounds usually employed for structural work, and reinforced cement. Thereby, in the case of steel frame building structures, the weight of all supporting beams, girders, columns and other metal parts may be materially diminished, which results in a great reduction of cost of such structures. Moreover, since the slag composing my new composition of matter is from the charcoal gray iron smelting process, and is hence free from iron, it is manifest that a great drawback which has made the use of cinders, ashes and similar substances undesirable on account of their destructive effect on iron and steel structural work, is removed by the new compound. This sulfur-free slag does not attack iron or steel and a concrete comprising the same can, therefore, be used in connection with iron or steel without any danger of corrosive or chemical destructive action thereon.

What I claim and desire to secure by Letters Patent is:—

The process of producing an insulating and building material which consists in floating incandescent blast-furnace slag upon water while simultaneously perforating the lower crust forming upon the mass, whereby the slag will be puffed and intimately vesiculated, comminuting the puffed slag, mixing the comminuted puffed slag with a binding material, and forming the mixture into shape.

In testimony whereof I hereunto affix my signature in the presence of two witnesses.

HEINRICH OTTMANN.

Witnesses:
ABRAHAM SCHLESINGER,
LOUIS T. MUELLER.